United States Patent

Sasaki et al.

(10) Patent No.: US 12,498,868 B2
(45) Date of Patent: Dec. 16, 2025

(54) MEMORY SYSTEM AND CONTROL METHOD

(71) Applicant: Kioxia Corporation, Tokyo (JP)

(72) Inventors: Yuki Sasaki, Kamakura Kanagawa (JP); Shinichi Kanno, Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/792,186

(22) Filed: Aug. 1, 2024

(65) Prior Publication Data

US 2024/0393970 A1   Nov. 28, 2024

Related U.S. Application Data

(63) Continuation of application No. 17/898,394, filed on Aug. 29, 2022, now Pat. No. 12,079,499.

(30) Foreign Application Priority Data

Mar. 16, 2022   (JP) ................................. 2022-041508

(51) Int. Cl.
G06F 3/06   (2006.01)

(52) U.S. Cl.
CPC ............ *G06F 3/064* (2013.01); *G06F 3/0607* (2013.01); *G06F 3/0656* (2013.01); *G06F 3/0679* (2013.01)

(58) Field of Classification Search
CPC ...... G06F 3/064; G06F 3/0607; G06F 3/0656; G06F 3/0679
See application file for complete search history.

(56) References Cited

U.S. PATENT DOCUMENTS

| | | | |
|---|---|---|---|
| 2004/0268017 A1* | 12/2004 | Uzrad-Nali | H04L 69/166 |
| | | | 711/1 |
| 2010/0011147 A1 | 1/2010 | Hummel et al. | |
| 2013/0151892 A1 | 6/2013 | Huang et al. | |
| 2015/0143031 A1 | 5/2015 | Lu | |
| 2016/0342511 A1 | 11/2016 | Fukuchi | |

(Continued)

FOREIGN PATENT DOCUMENTS

| | | |
|---|---|---|
| DE | 19945993 A1 | 9/2000 |
| JP | 2019-105873 A | 6/2019 |
| WO | 2019/244656 A1 | 12/2019 |

OTHER PUBLICATIONS

Cai, Y. et al. "Error Characterization, Mitigation, and Recovery in Flash-Memory-Based Solid-State Drives," Proceedings of the IEEE 105.9 (Aug. 18, 2017): 1666-1704. (Year: 2017).

*Primary Examiner* — Francisco A Grullon
(74) *Attorney, Agent, or Firm* — Kim & Stewart LLP

(57) ABSTRACT

A memory system includes a volatile memory, a nonvolatile memory, and a controller. The controller is configured to set a block group of the nonvolatile memory to be in a writable state and generate in the volatile memory a list associated with the block group. The controller is configured to, with respect to a write command, add an entry to the list, which includes a first address of a host and a second address of the volatile memory, obtain the write data from the first address of the host and store the write data in the second address of the volatile memory, write the write data stored at the second address of the volatile memory into the block group, and upon the block group being fully written, set the block group to be in a non-writable state and dissociate the list from the block group.

20 Claims, 9 Drawing Sheets

(56) References Cited

U.S. PATENT DOCUMENTS

| | | |
|---|---|---|
| 2018/0341606 A1 | 11/2018 | Bolkhovitin et al. |
| 2019/0179567 A1 | 6/2019 | Kanno et al. |
| 2019/0332316 A1 | 10/2019 | Kanno et al. |
| 2020/0241797 A1* | 7/2020 | Kanno ................ G06F 3/0656 |
| 2020/0241799 A1 | 7/2020 | Kanno |
| 2021/0064291 A1* | 3/2021 | Kanno ................ G06F 3/0656 |
| 2021/0200473 A1 | 7/2021 | Okada et al. |
| 2021/0223986 A1 | 7/2021 | Kanno |
| 2022/0171717 A1 | 6/2022 | Ghodrat |

* cited by examiner

MEMORY SYSTEM AND CONTROL METHOD

CROSS-REFERENCE TO RELATED APPLICATION(S)

This application is a continuation of U.S. patent application Ser. No. 17/898,394, filed on Aug. 29, 2022, which is based upon and claims the benefit of priority from Japanese Patent Application No. 2022-041508, filed Mar. 16, 2022, the entire contents of each of which are incorporated herein by reference.

FIELD

Embodiments described herein relate generally to a technique for controlling a non-volatile memory.

BACKGROUND

Memory systems each including a non-volatile memory are widely used. As one of such memory systems, a solid state drive (SSD) including a NAND flash memory is known.

In the memory system such as the SSD, write data is received from a host based on a write command received from the host. The received write data needs to be temporarily stored in a volatile memory of the memory system until the received write data is written into the non-volatile memory.

DETAILED DESCRIPTION

Embodiments provide a memory system and a control method capable of efficiently managing write data.

In general, according to an embodiment, a memory system includes a volatile memory, a nonvolatile memory including a plurality of blocks, and a controller. The controller is configured to set a first group of the blocks to be in a writable state, generate in the volatile memory a first list associated with the first group of blocks, with respect to each of one or more write commands received from a host connected to the memory system, determine whether write data corresponding to the write command is to be stored in the first group of blocks. Further, the controller is configured to, with respect to each write command corresponding to write data that are determined to be stored in the first group of blocks, add an entry to the first list, the entry including a first address of the host in which the corresponding write data is stored and a second address of the volatile memory in which the corresponding write data is to be temporarily stored, receive the corresponding write data from the first address of the host and store the corresponding write data in the second address of the volatile memory, and write the corresponding write data stored at the second address of the volatile memory into the first group of blocks. The controller is further configured to, upon the first group of blocks being fully written, set the first group of blocks to be in a non-writable state and dissociate the first list from the first group of blocks.

Hereinafter, an embodiment will be described with reference to the drawings.

Figure 1:
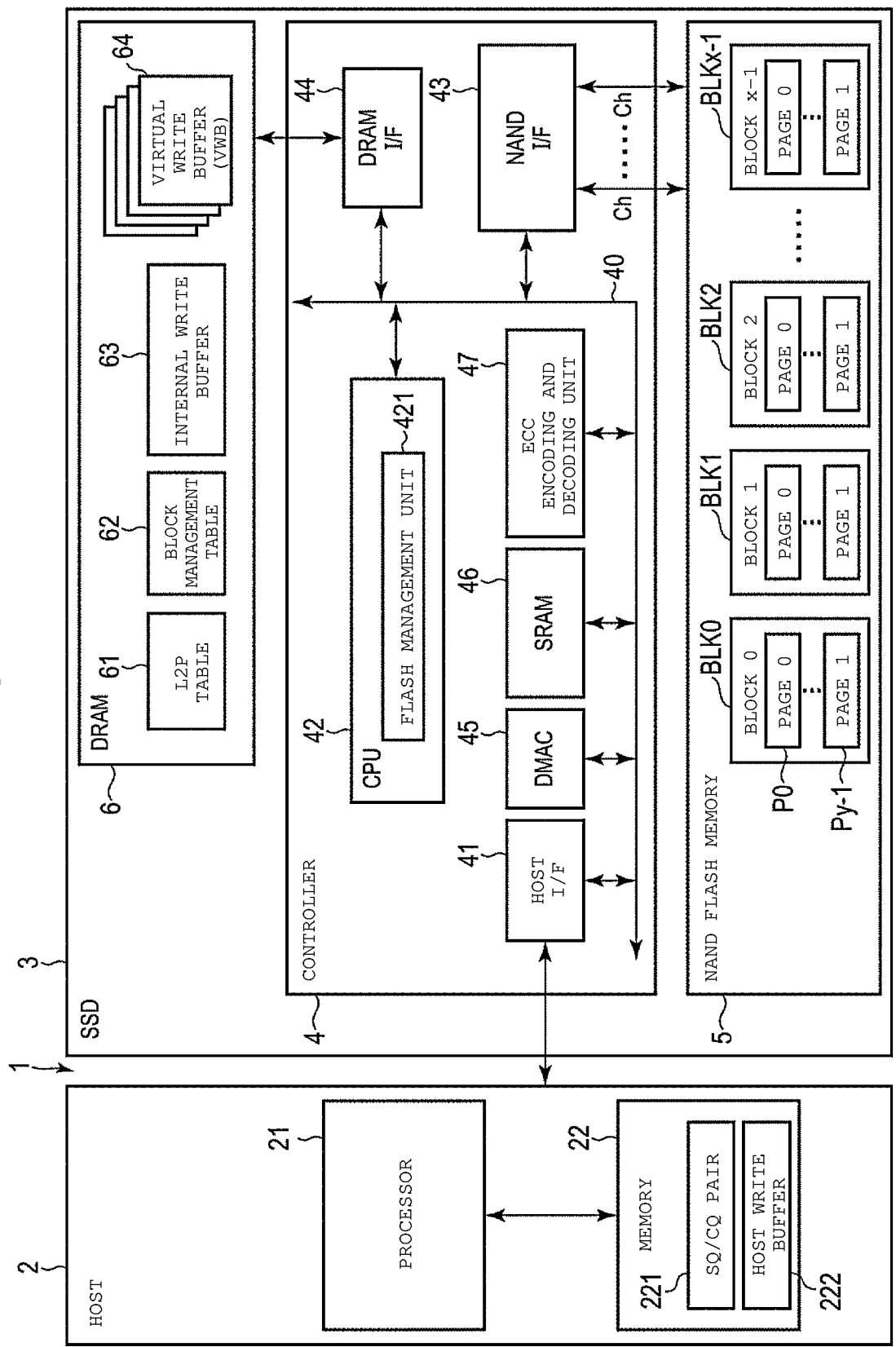
FIG. 1 is a block diagram illustrating a configuration example of an information processing system including a memory system according to an embodiment.

First, a configuration of an information processing system including a memory system according to the embodiment will be described. FIG. 1 is a block diagram illustrating a configuration example of an information processing system including a memory system and a host according to the embodiment. Hereinafter, it is assumed that the memory system according to the embodiment is implemented as a solid state drive (SSD) 3.

An information processing system 1 includes a host (may be referred to as a host device) 2 and the SSD 3.

The host 2 is an information processing apparatus that accesses the SSD 3. Examples of the information processing apparatus include personal computers, server computers, and various other computing devices. The host 2 transmits a write request (may be referred to as a write command), which is a request for writing data to the SSD 3. The host 2 also transmits a read request (may be referred to as a read command), which is a request for reading data to the SSD 3.

The SSD 3 is a semiconductor storage device configured to write data to a non-volatile memory and read data from the non-volatile memory. For example, a NAND flash memory is used as the non-volatile memory. The SSD 3 executes a data write operation based on the write command received from the host 2. The SSD 3 also executes a data read operation based on the read command received from the host 2.

Examples of a standard of a logical interface for connecting the host 2 and the SSD 3 include Serial Attached SCSI (SAS), Serial ATA (SATA), and NVM Express™ (NVMe™).

Next, components of the host 2 will be described. The host 2 includes a processor 21 and a memory 22.

The processor 21 is a central processing unit (CPU). The processor 21 is configured to control an operation of each component of the host 2. The processor 21 executes software (e.g., host software) loaded from the SSD 3 into the memory 22. The host 2 may include a storage device other than the SSD 3. In this case, the host software may be loaded into the memory 22 from another storage device. The host software includes operating systems, file systems, device drivers, application programs, and the like.

The memory 22 is a main memory provided in the host 2. The memory 22 is a volatile semiconductor memory. The memory 22 is implemented by, for example, a random access memory such as a dynamic random access memory (DRAM).

The memory 22 includes one or more submission queue/completion queue pairs (SQ/CQ pairs) 221 and a host write buffer 222.

The SQ/CQ pair 221 includes a submission queue (SQ) and a completion queue (CQ) associated with the submission queue (SQ).

The submission queue (SQ) is a queue used to issue a request (may be referred to as a command) to the SSD 3. The completion queue (CQ) is a queue used to receive a response indicating command completion from the SSD 3.

The host 2 transmits various commands to the SSD 3 via the submission queue (SQ) included in the SQ/CQ pair 221. The host 2 receives the command completion from the SSD 3 via the completion queue (CQ) included in the SQ/CQ pair 221.

Next, components of the SSD 3 will be described. The SSD 3 includes a controller 4, a NAND flash memory 5, and a DRAM 6.

The controller 4 is electrically connected to the NAND flash memory 5, which is the non-volatile memory, via a NAND interface 43 such as a Toggle NAND flash interface and an open NAND flash interface (ONFI). The controller 4 operates as a memory controller configured to control the NAND flash memory 5. The controller 4 may be implemented by a circuit such as a system-on-a-chip (SoC).

The NAND flash memory 5 includes a memory cell array including a plurality of memory cells arranged in a matrix configuration. The NAND flash memory 5 may be a flash memory having a two-dimensional structure or a flash memory having a three-dimensional structure.

The memory cell array of the NAND flash memory 5 includes a plurality of blocks BLK0 to BLKx-1. Each of the blocks BLK0 to BLKx-1 includes a plurality of pages (here, pages P0 to Py-1). Each of the blocks BLK0 to BLKx-1 functions as a unit of a data erase operation. The blocks may be referred to as "erase blocks", "physical blocks", or "flash blocks". Each of the pages P0 to Py-1 is a unit of a data write operation and a unit of a data read operation.

The DRAM 6 is a volatile semiconductor memory. The DRAM 6 is used, for example, to temporarily store data to be written into the NAND flash memory 5. A storage area of the DRAM 6 is also used to store various kinds of management data used by the controller 4.

Next, a detailed configuration of the controller 4 will be described.

The controller 4 includes a host interface (I/F) 41, a CPU 42, a NAND interface (I/F) 43, a DRAM interface (I/F) 44, a direct memory access controller (DMAC) 45, a static RAM (SRAM) 46, and an error correction code (ECC) encoding and decoding unit 47. The host interface 41, the CPU 42, the NAND interface 43, the DRAM interface 44, the DMAC 45, the SRAM 46, and the ECC encoding and decoding unit 47 are interconnected via a bus 40.

The host interface 41 is a host interface circuit that executes communication with the host 2. The host interface 41 is, for example, a Peripheral Component Interconnect Express (PCIe) controller. Alternatively, when the SSD 3 incorporates a network interface controller therein, the host interface 41 may be implemented as a part of the network interface controller. The host interface 41 receives various commands from the host 2. These commands include a write command, a read command, a copy command, and the like.

The CPU 42 is a processor. The CPU 42 controls the host interface 41, the NAND interface 43, the DRAM interface 44, the DMAC 45, the SRAM 46, and the ECC encoding and decoding unit 47. The CPU 42 loads a control program (e.g., firmware) from the NAND flash memory 5 or a ROM (not illustrated) into the DRAM 6 or the SRAM 46 according to the supply of power to the SSD 3.

The NAND interface 43 is a memory interface circuit that controls a plurality of non-volatile memory dies. The NAND interface 43 controls the NAND flash memory 5 under the control of the CPU 42. The NAND interface 43 is connected to a plurality of NAND flash memory dies via, for example, a plurality of channels (Ch). Communication between the NAND interface 43 and the NAND flash memory 5 is executed, for example, in accordance with the Toggle NAND flash interface or the open NAND flash interface (ONFI).

The DRAM interface 44 is a DRAM interface circuit that communicates with the DRAM 6 to control the DRAM 6. The DRAM interface 44 operates under the control of the CPU 42.

The DMAC 45 executes data transfer between the memory 22 of the host 2 and the DRAM 6 (or the SRAM 46) under the control of the CPU 42. When write data is to be transferred from the host write buffer 222 on the memory 22 of the host 2 to an internal write buffer 63, the CPU 42 designates, for the DMAC 45, a transfer source address indicating a location on the host write buffer 222, a size of write data to be transferred, and a transfer destination address indicating a location on the internal write buffer 63. The internal write buffer 63 is a storage area for temporarily storing write data associated with each write request received from the host 2. For example, a part of the storage area of the DRAM 6 is used as the internal write buffer 63. Alternatively, instead of a part of the storage area of the DRAM 6, a part of a storage area of the SRAM 46 may be used as the internal write buffer 63.

The SRAM 46 is a volatile memory. The SRAM 46 is used, for example, as a work area of the CPU 42.

When data is to be written to the NAND flash memory 5, the ECC encoding and decoding unit 47 executes encoding for adding an error correction code (ECC) to the data. When data is read from the NAND flash memory 5, the ECC encoding and decoding unit 47 executes decoding for performing error correction of this data by using the ECC added to the read data.

Next, components of the DRAM 6 will be described. The DRAM 6 includes a logical to physical address translation table (L2P table) 61, a block management table 62, the internal write buffer 63, and virtual write buffers 64.

The L2P table 61 is a table that stores mapping information. The mapping information is information indicating a correspondence relationship between the logical address and the physical address. The logical address is an address that identifies data to be accessed used by the host 2. A logical block address (LBA) is used as the logical address. One LBA corresponds to, for example, data of one sector (for example, 4 KiB). The physical address is an address that specifies a physical storage location of the NAND flash memory 5. The physical address includes, for example, a block address and an intra-block offset. The block address is an address that can uniquely specify a block. In a case where the NAND flash memory 5 includes a plurality of NAND flash dies, a block address of a certain block may be represented by a die ID of a NAND flash die and a block ID in the NAND flash die. The intra-block offset is an offset address that can uniquely specify a storage location included in the block. An offset address of a specific storage location within a block may be represented by the number of sectors from a storage location at a head of the block to the specific storage location.

The block management table 62 is used to store management information for managing the plurality of blocks of the NAND flash memory 5. The block management table 62 includes an open block list 621, a closed block list 622, and a free block list 623 (see FIG. 4). The open block list 621 is a list in which blocks in an open state are registered. The open state is a state where a block is in use as a write destination block. The closed block list 622 is a list in which blocks in a closed state are registered. The closed state is a state where a block is filled with data and is managed as an active block. The free block list 623 is a list in which blocks that can be newly assigned to the open block list 621 are registered. The management information managed by the block management table 62 may further include the number of rewrites (i.e., the number of programs/erase cycles) of the corresponding block.

The virtual write buffer 64 stores information about write data to be written into the NAND flash memory 5. One virtual write buffer 64 corresponds to one block. The virtual write buffer 64 includes a sector descriptor list (SDL). The SDL stores, for example, a source address and a buffer address for each write data of a management size to be written into a block corresponding to the virtual write buffer 64. The management size is, for example, a size of a sector (e.g., 4 KiB). The source address is an address indicating the storage location where data to be written into the write destination block is stored on a management size (i.e., sector) basis. The source address is, for example, a memory address indicating a storage location in the host write buffer 222 where write data is stored, a physical address of the NAND flash memory 5 indicating a storage location in a copy source block of the NAND flash memory 5 where data to be copied is stored, and the like. The buffer address is an address indicating a location in the internal write buffer 63 where data to be written into the write destination block is temporality stored on a management size (i.e., sector) basis. Thus, the virtual write buffer 64 does not store the write data itself to be written into the write destination block, but stores the source address and the buffer address of the write data as a list.

Next, an example of a functional configuration of the CPU 42 will be described. The CPU 42 functions as a flash management unit 421. A part or the whole of the flash management unit 421 may be implemented by dedicated hardware of the controller 4.

The flash management unit 421 writes the write data to the NAND flash memory 5 based on the write command received from the host 2. The write command is a command for instructing the NAND flash memory 5 to write data to be written (may be referred to as write data).

The write command designates a memory address indicating the storage location of the host write buffer 222 where the write data is stored, and a size of the write data. The size of the write data is designated by the number of pieces of unit data having a management size such as a sector. That is, the write command designates a memory address of the host write buffer 222 in which the write data is stored and the number of pieces of unit data having a first management size included in the write data.

The flash management unit 421 reads the data to be copied stored in the NAND flash memory 5 based on a copy command, and writes the read data to be copied to another block of the NAND flash memory 5. The copy command may be issued by the host 2. The copy command may be issued internally by the controller 4 during a garbage collection (i.e., compaction) operation, instead of being issued by the host 2.

The copy command includes, for example, a block address of the copy source block, an offset address indicating the storage location in the copy source block where the copy target data is stored, a size of the data to be copied, and a block address of a copy destination block to which the data to be copied is to be stored. The size of the data to be copied is designated by the number of sectors.

The flash management unit 421 manages a plurality of block groups. Each of the plurality of block groups includes two or more blocks BLK (physical blocks) among the plurality of blocks BLK (physical blocks) provided in the NAND flash memory 5. The block group is also called a superblock.

Figure 2:
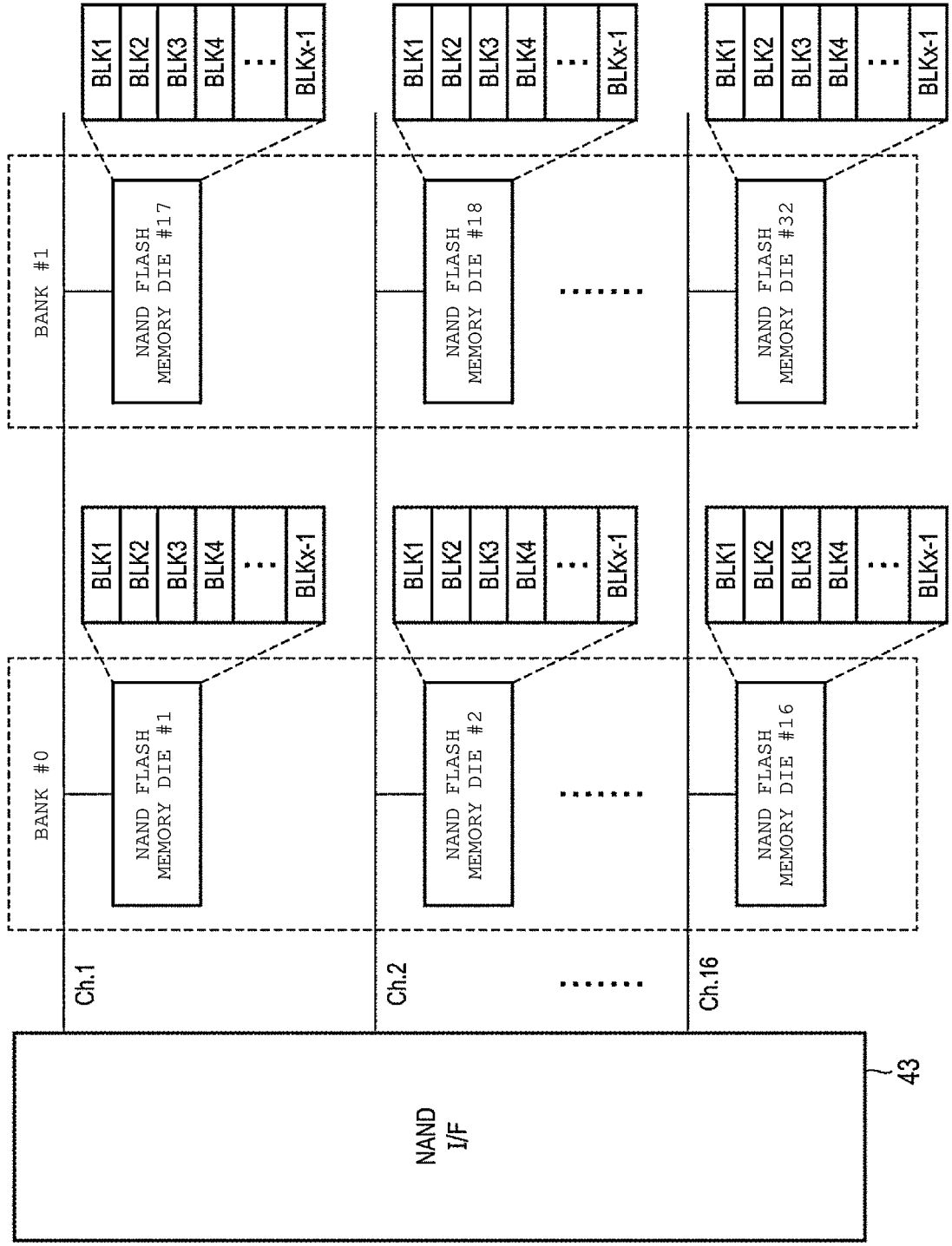
FIG. 2 is a block diagram illustrating an example of a relationship between a plurality of channels and a plurality of NAND flash memory dies used in the memory system according to the embodiment.

Next, a configuration of the NAND flash memory 5 including the plurality of NAND flash memory dies will be described. FIG. 2 is a block diagram illustrating an example of a relationship between the plurality of channels and the plurality of NAND flash memory dies used in the memory system according to the embodiment.

Each of the plurality of NAND flash memory dies can operate independently. Thus, the NAND flash memory die is handled as a unit capable of operating in parallel. FIG. 2 illustrates a case where 16 channels ch.1 to ch. 16 are connected to the NAND interface (I/F) 43 and two NAND flash memory dies are connected to each of the 16 channels ch.1 to ch.16.

In this case, 16 NAND flash memory dies #1 to #16 connected to the channels Ch.1 to Ch. 16 may form a bank #0, and the remaining 16 NAND flash memory dies #17 to #32 connected to the channels Ch. 1 to Ch. 16 may form a bank #1. The bank is a unit for operating the plurality of memory dies in parallel by bank interleaving. In the configuration example of FIG. 2, a maximum of 32 NAND flash memory dies can be operated in parallel by 16 channels and bank interleaving using two banks.

The erase operation may be executed in units of one block (physical block), or may be executed in units of a block group including a set of a plurality of physical blocks capable of operating in parallel. The block group is also referred to as a superblock.

One block group, that is, one superblock including a set of a plurality of physical blocks may include, but is not limited to, a total of 32 physical blocks selected one by one from the NAND flash memory dies #1 to #32. Each of the NAND flash memory dies #1 to #32 may have a multi-plane configuration. For example, when each of the NAND flash memory dies #1 to #32 has a multi-plane configuration including two planes, one superblock may include a total of 64 physical blocks selected one by one from 64 planes corresponding to the NAND flash memory dies #1 to #32.

Figure 3:
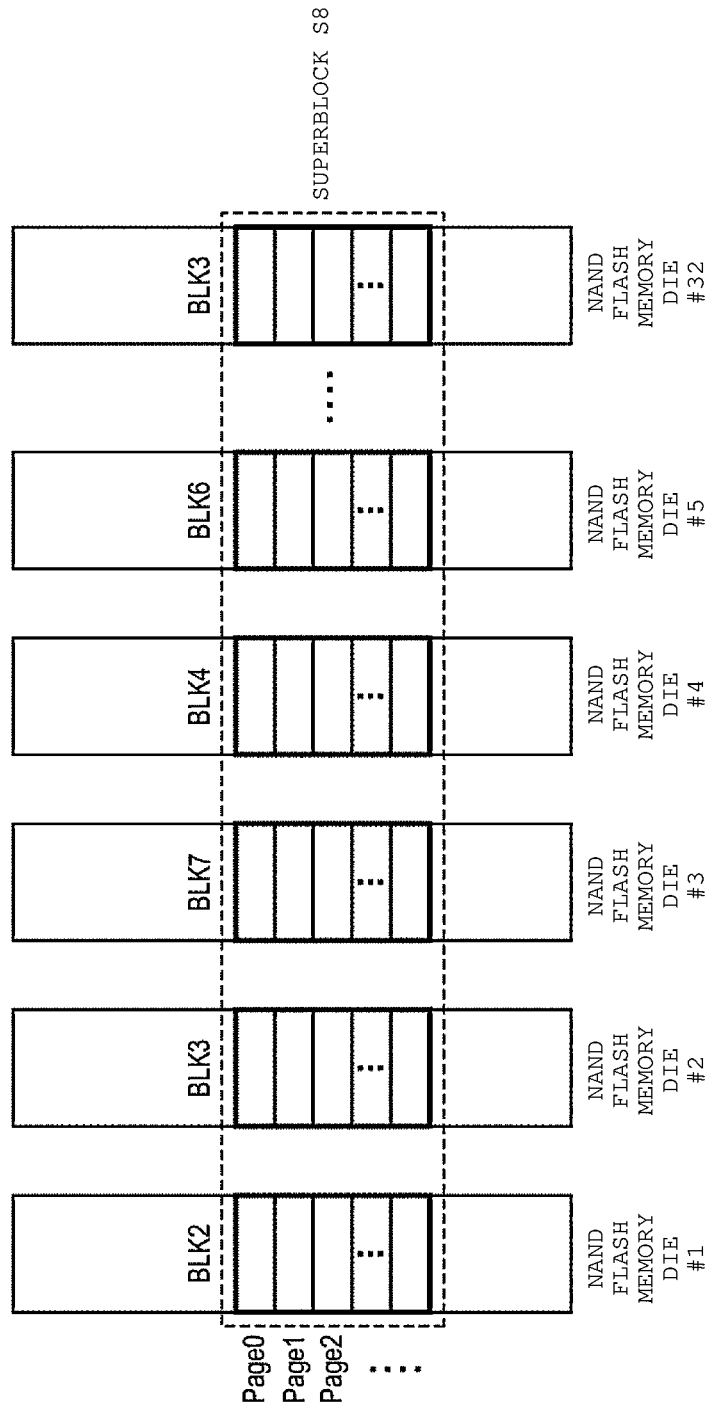
FIG. 3 is a diagram illustrating a configuration example of a superblock used in the memory system according to the embodiment.

FIG. 3 illustrates one superblock (SB) including 32 physical blocks (here, the physical block BLK2 in the NAND flash memory die #1, the physical block BLK3 in the NAND flash memory die #2, the physical block BLK7 in the NAND flash memory die #3, the physical block BLK4 in the NAND flash memory die #4, the physical block BLK6 in the NAND flash memory die #5, ... and the physical block BLK3 in the NAND flash memory die #32).

In an alternative implementation, one superblock may include only one physical block, and in this case, one superblock is equivalent to one physical block.

Figure 4:
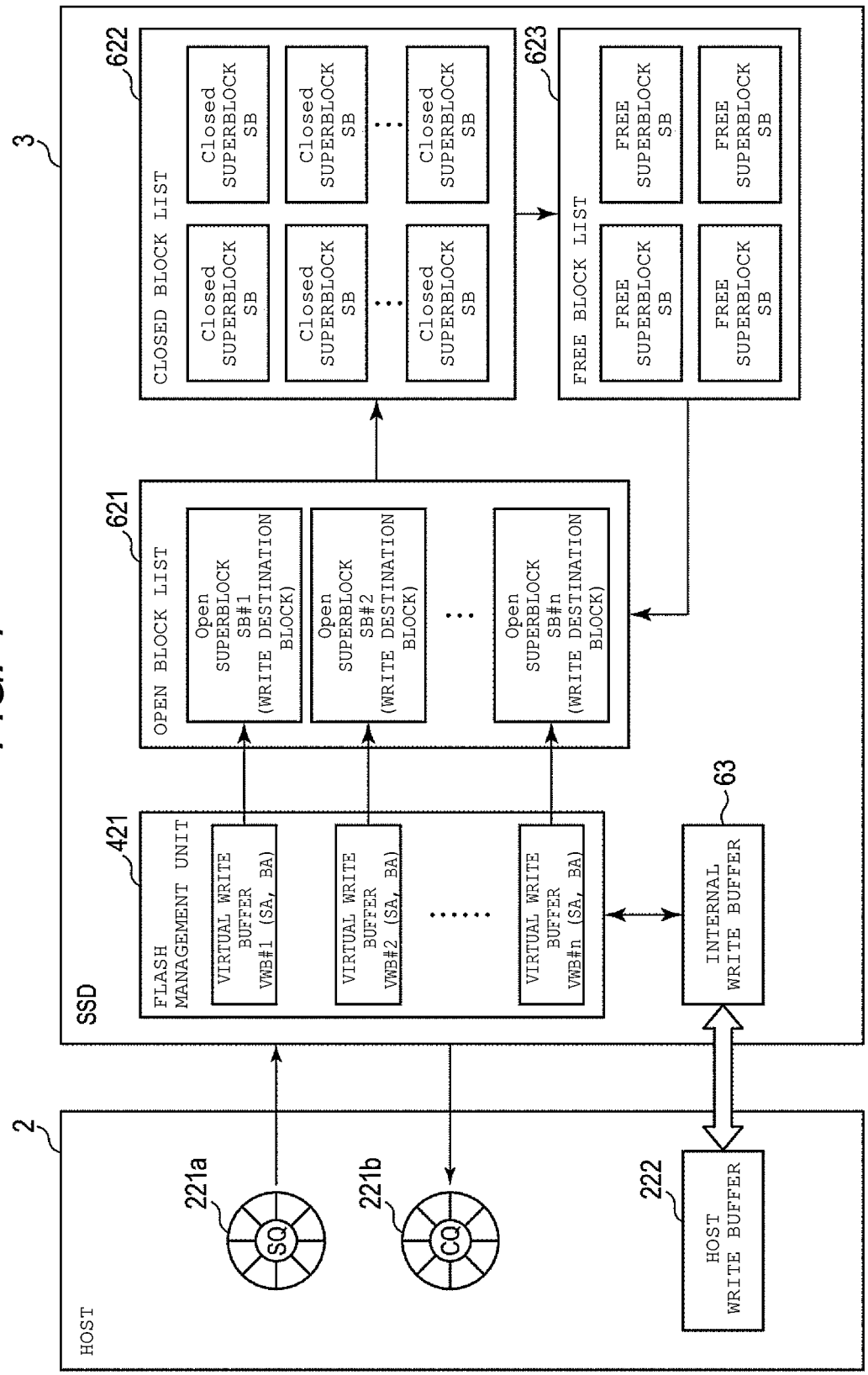
FIG. 4 is a diagram illustrating block management executed in the memory system according to the embodiment.

Next, block management will be described. FIG. 4 is a diagram illustrating block management executed in the SSD 3 according to the embodiment.

The flash management unit 421 manages a plurality of blocks used to store write data (may be referred as write destination blocks). The write destination block is a block in an open state where data can be written. The write destination block is managed by using the open block list 621. In a case where the flash management unit 421 is configured to manage a plurality of blocks corresponding to a plurality of zones defined in a zoned namespace standard, respectively, a block corresponding to a zone to be written is assigned as a write destination block. In a case where the flash management unit 421 is configured to manage an area associated with a die group, a block selected from a set of blocks provided in the NAND flash memory die included in the area to be written may be assigned as a write destination block for the area to be written. One die group includes one or a plurality of NAND flash memory dies. Each of the plurality of NAND flash memory dies provided in the NAND flash memory 5 belongs to only one die group.

The host 2 stores a write command to be transmitted to the SSD 3 in a submission queue (SQ) 221a. The submission queue (SQ) 221a is, for example, a ring buffer. The submission queue (SQ) 221a is managed by using a submission queue tail pointer (SQTP) and a submission queue head pointer (SQHP). The host 2 stores the write command in an entry designated by the submission queue tail pointer (SQTP). When one write command is stored in the submission queue (SQ) 221a, the host 2 increments the submission queue tail pointer (SQTP) by 1.

In response to the submission queue tail pointer (SQTP) being incremented, the flash management unit 421 fetches the write command stored in the entry designated by the submission queue head pointer (SQHP). When one write command is fetched, the flash management unit 421 increments the submission queue head pointer (SQHP) by 1.

When the write command is fetched, the flash management unit 421 determines a block into which write data associated with the fetched write command is to be written.

For example, in the case where a zone is designated by the write command, the flash management unit 421 may select a block (or superblock) corresponding to the zone designated by the write command, and may assign the selected block (or superblock) as a write destination block. When the superblock corresponding to the zone designated by the write command is previously assigned as the write destination block, the execution of this processing is omitted.

When an identifier of the area associated with the die group is designated by the write command, the flash management unit 421 may select one block (or superblock) from a set of blocks (or superblocks) included in the die group associated with the identifier of the area designated by the write command, and may assign the selected block (or superblock) as a write destination block for the designated area. When the write destination block for the area designated by the write command is previously assigned, the execution of this processing is omitted.

When a certain superblock is assigned as a write destination superblock, the flash management unit 421 assigns one virtual write buffer VWB to this superblock. FIG. 4 illustrates a case where a superblock SB #1, a superblock SB #2, . . . , and a superblock SB #n are assigned as write destination superblocks (may be referred to as Open superblocks), respectively. A virtual write buffer VWB #1, a virtual write buffer VWB #2, . . . , and a virtual write buffer VWB #n are assigned to the superblock SB #1, the superblock SB #2, and the superblock SB #n, respectively.

The flash management unit 421 stores, as a source address (SA), first storage location information indicating each memory address of the host write buffer 222 where each unit data included in the write data associated with the fetched write command is stored in the virtual write buffer 64.

For example, when the write destination superblock into which the write data associated with the fetched write command is to be written is the superblock SB #1, the flash management unit 421 stores the first storage location information as the source address (SA) in the virtual write buffer VWB #1. Whenever a write command for writing data to the superblock SB #1 is fetched, the flash management unit 421 stores the first storage location information as the source address (SA) in the virtual write buffer VWB #1.

When the write destination superblock into which the write data associated with the fetched write command is to be written is the superblock SB #2, the flash management unit 421 stores, as the source address (SA), first storage location information indicating each memory address of the host write buffer 222 where each unit data included in the write data associated with the fetched write command is stored in the virtual write buffer VWB #2. Whenever a write command for writing data to the superblock SB #2 is fetched, the flash management unit 421 stores the first storage location information as the source address (SA) in the virtual write buffer VWB #2. Hereinafter, the processing by the flash management unit 4211 will be described on the assumption that the write data is written into the Open superblock SB #1.

When the write data is written into the superblock SB #1, the flash management unit 421 acquires the write data from a location on the host write buffer 222 indicated by each source address (SA) of the virtual write buffer VWB #1. For example, when the writing of data to the superblock SB #1 can be started, the flash management unit 421 acquires the write data from a location on the host write buffer 222 indicated by each source address (SA) of the virtual write buffer VWB #1. Specifically, the flash management unit 421 may determine whether or not a size of unreceived write data to be written into the superblock SB #1 reaches a write size of the NAND flash memory 5 based on the number of source addresses (SA) stored in the virtual write buffer VWB #1. When the size of the unreceived write data reaches the write size of the NAND flash memory 5, the flash management unit 421 acquires write data having the write size from the location on the host write buffer 222 indicated by each source address (SA) of the virtual write buffer VWB #1.

The flash management unit 421 determines each memory address indicating a location in the internal write buffer 63 to which the acquired write data is to be stored, and stores the acquired write data in the determined memory address in the internal write buffer 63. The flash management unit 421 stores, as a buffer address (BA) of a data transfer buffer to the superblock SB #1, second storage location information indicating each memory address on the internal write buffer 63 where the unit data included in the write data is stored, in the virtual write buffer VWB #2.

The flash management unit 421 acquires write data from the memory address on the internal write buffer 63 indicated by each buffer address (BA) of the virtual write buffer VWB #1, and writes the acquired write data to the superblock SB #1.

When the writing of the write data to the superblock SB #1 is completed, the flash management unit 421 stores a response indicating the completion of the write command corresponding to the write data in a completion queue (CQ) 221*b* of the host 2.

The flash management unit 421 manages storage location management information indicating a head location of a write incompletion area of the superblock on a superblock basis. The storage location management information is referred to as an unreadable point URP. When a readable area of the superblock SB #1 is expanded by the writing of data to the superblock SB #1, the flash management unit 421 updates the unreadable point URP of the superblock SB #1. The readable area is an area where data is readable. The updated unreadable point URP indicates a value obtained by adding 1 to an offset address indicating a storage location at an end of the write completion area of the superblock SB #1.

When there is no unwritten area in the superblock SB #1, a value of the unreadable point URP of the superblock SB #1 becomes the value obtained by adding 1 to the offset address of the storage location at an end of the superblock SB #1. That is, the value of the unreadable point URP coincides with a value corresponding to a capacity of the superblock SB #1. In this case, the flash management unit 421 manages the superblock SB #1 as a superblock in a closed state (may be referred to as Closed superblock) by using the closed block list 622. At this time, the flash management unit 421 dissociates the virtual write buffer VWB #1 from the superblock SB #1. Accordingly, the virtual write buffer VWB #1 is available to manage write data to another superblock assigned as a new write destination block.

When all pieces of valid data stored in the superblock managed by the closed block list 622 becomes invalid data, the flash management unit 421 manages the superblock as a free block by using the free block list 623. The valid data is data stored in the storage location indicated by the physical address associated with the logical address. The invalid data is data stored in the storage location indicated by the physical address that is not associated with any logical address.

Figure 5:
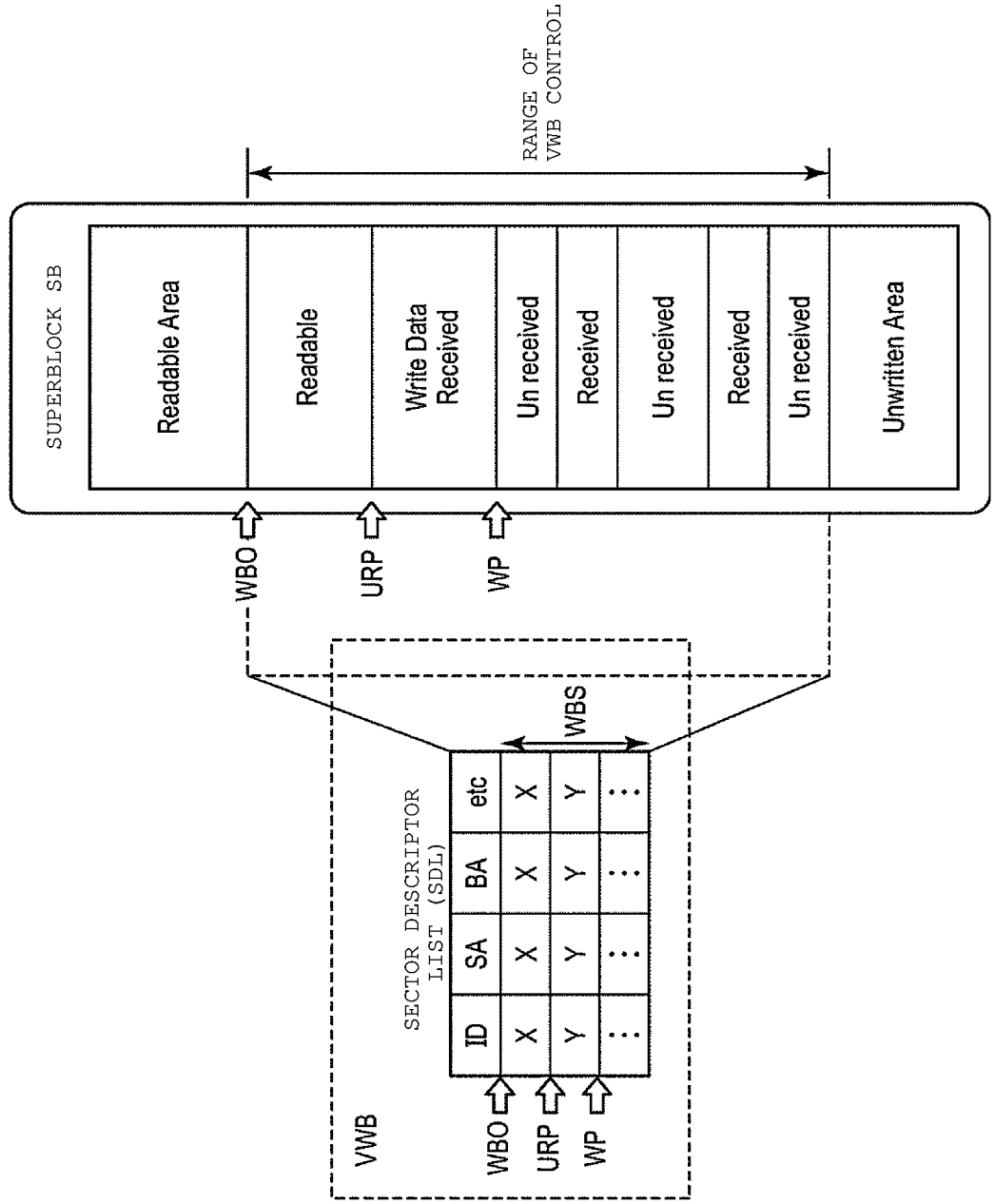
FIG. 5 is a diagram illustrating a relationship between a superblock and a virtual write buffer used in the memory system according to the embodiment.

Next, a relationship between the superblock and the virtual write buffer 64 will be described. FIG. 5 is a diagram illustrating a relationship between the superblock and the virtual write buffer 64 used in the SSD 3 according to the embodiment. In FIG. 5, the storage area of the superblock SB and the sector descriptor list (SDL) of the virtual write buffer VWB assigned to the superblock SB are illustrated.

The storage area of the superblock SB includes a readable area (Readable Area or Readable in FIG. 5), a write data received area (Write Data Received or Received in FIG. 5), a write data unreceived area (Un received in FIG. 5), and an unwritten area (Unwritten Area in FIG. 5).

The readable area is a storage area where the data write operation is completed. For example, when the writing of data to a total of eight storage locations from an initial storage location to an eighth storage location of the superblock SB is completed, these eight storage locations are the readable area. An offset address of a storage location at a head of the readable area is, for example, offset+0. An offset address of the eighth storage location is, for example, offset+7.

The write data received area is a storage area where the source address indicating the storage location where write data to be written is stored is registered in the virtual write buffer VWB (but the data write operation is not completed). For example, when source addresses indicating storage locations where write data are stored in a total of eight storage locations from a ninth storage location to a sixteenth storage location of the superblock SB are registered in the virtual write buffer VWB, these eight storage locations are the write data received area. An offset address of the ninth storage location is offset+8. An offset address of the sixteenth storage location is offset+15.

The write data unreceived area is a storage area where the source address indicating the storage location where the write data is stored is not registered in the virtual write buffer VWB (although the write command is received). For example, when source addresses indicating storage locations where write data are stored in a total of eight storage locations from a seventeenth storage location to a twenty-fourth storage location of the superblock SB are not registered in the virtual write buffer VWB, these eight storage locations are the write data unreceived area. An offset address of the seventeenth storage location is offset+16. An offset address of the twenty-fourth storage location is offset+ 23.

The unwritten area is a storage area where the write command corresponding to the write data to be written is not received.

All areas other than the readable area correspond to the write incompletion area.

The virtual write buffer VWB stores the source address (SA) and the buffer address (BA) of the write data to be written into a storage area of a part of all the storage areas of the superblock SB on a sector basis by using the sector descriptor list (SDL). A range of the storage area where the source address (SA) and the buffer address (BA) are stored, that is, a range of the storage area of the superblock SB managed by the virtual write buffer VWB is shifted from a head to an end of the superblock SB as the write operation to the superblock SB progresses. Initially, a head location of the range of the storage area of the superblock SB managed by the virtual write buffer VWB coincides with a head storage location at the head of the superblock SB. The readable area of the superblock SB is expanded as the write operation to the superblock SB progresses. As the readable area is expanded, the head location of the range of the storage area of the superblock SB managed by the virtual write buffer VWB is gradually shifted towards the end of the superblock SB.

The SDL is controlled by using Virtual Write Buffer Start Offset (WBO), Un-Readable Point (URP), Writable Point (WP), and Virtual Write Buffer Size (WBS).

The WBO is a start offset address of the virtual write buffer VWB. The start offset address of the virtual write buffer VWB is an offset address indicating a head location of the range of the storage area of the superblock SB managed by the virtual write buffer VWB. The WBO of the virtual write buffer VWB assigned to the superblock SB immediately after the transition of the superblock SB to the open state is, for example, 0. When the WBO is 0, the WBO indicates a storage location (offset address=+0) at the head of the superblock SB.

The URP is a minimum offset address of the write incompletion area of the superblock SB. That is, the URP indicates a head location of the write incompletion area of the superblock SB. The URP is managed by using the block management table 62 corresponding to the superblock SB. Accordingly, even after the state of the superblock SB transitions to the closed superblock, the URP is maintained in the block management table 62 corresponding to the superblock SB. The URP of the virtual write buffer VWB assigned to the superblock SB immediately after the transition of the superblock SB to the open state is, for example, 0. When the URP is 0, the URP indicates a storage location (offset address=+0) at the head of the superblock SB.

The WP is a minimum offset address for which write data is not received. The WP indicates a storage location at a head of the write data unreceived area. The WP of the virtual write buffer VWB assigned to the superblock SB immediately after the transition of the superblock SB to the open state is, for example, 0. When the WP is 0, the WP indicates a storage location (offset address=+0) at the head of the superblock SB.

The WBS indicates the number of sectors managed by using the virtual write buffer VWB. That is, the WBS is information indicating a size of the SDL (the number of entries in the SDL).

The SDL includes a plurality of entries. The number of entries included in the SDL is, for example, the same as the number of sectors indicated by the WBS. One entry in the SDL is associated with one storage location in the superblock SB indicated by one offset address. One storage location of the superblock SB corresponds to one sector.

The entry of the SDL stores an identifier (ID), a source address (SA), a buffer address (BA), and other information.

The ID is an identifier of a command (write command or copy command) that requests writing to the storage location (sector) of the superblock SB.

The source address (SA) is an address indicating a storage location where data to be written into the storage location (sector) of the superblock SB is stored. The source address (SA) is, for example, the memory address of the host write buffer 222 or the physical address of the NAND flash memory 5. When the data to be written is previously present in the internal write buffer 63, the memory address of the internal write buffer 63 may be used as the source address (SA).

The buffer address (BA) is an address indicating the storage location of the internal write buffer 63 where the data to be written into the storage location (sector) of the superblock SB is stored. When the data to be written is not present in the internal write buffer 63, an invalid address may be stored as the buffer address (BA).

In the SDL in FIG. 5, an identifier (ID)X, a source address (SA)X, and a buffer address (BA)X are stored in an entry corresponding to the write data to be written into the offset address indicated by the WBO. When the writing of the write data is completed and the write data becomes readable from the superblock SB, the controller 4 updates the URP such that the URP indicates an entry in which an identifier (ID)Y, a source address (SA)Y, and a buffer address (BA)Y are stored. The controller 4 confirms that the data transfer from the storage location of the internal write buffer 63 indicated by the buffer address (BA)X to the memory 22 of the host 2 is not executed, and then updates the WBO such that the WBO indicates the entry where the identifier (ID)Y, the source address (SA)Y, and the buffer address (BA)Y are stored. The entry in which the identifier (ID)X, the source address (SA)X, and the buffer address (BA)X are stored is released (i.e., cleared). This released entry is available for managing new write data to be written into the superblock SB.

Figure 6:
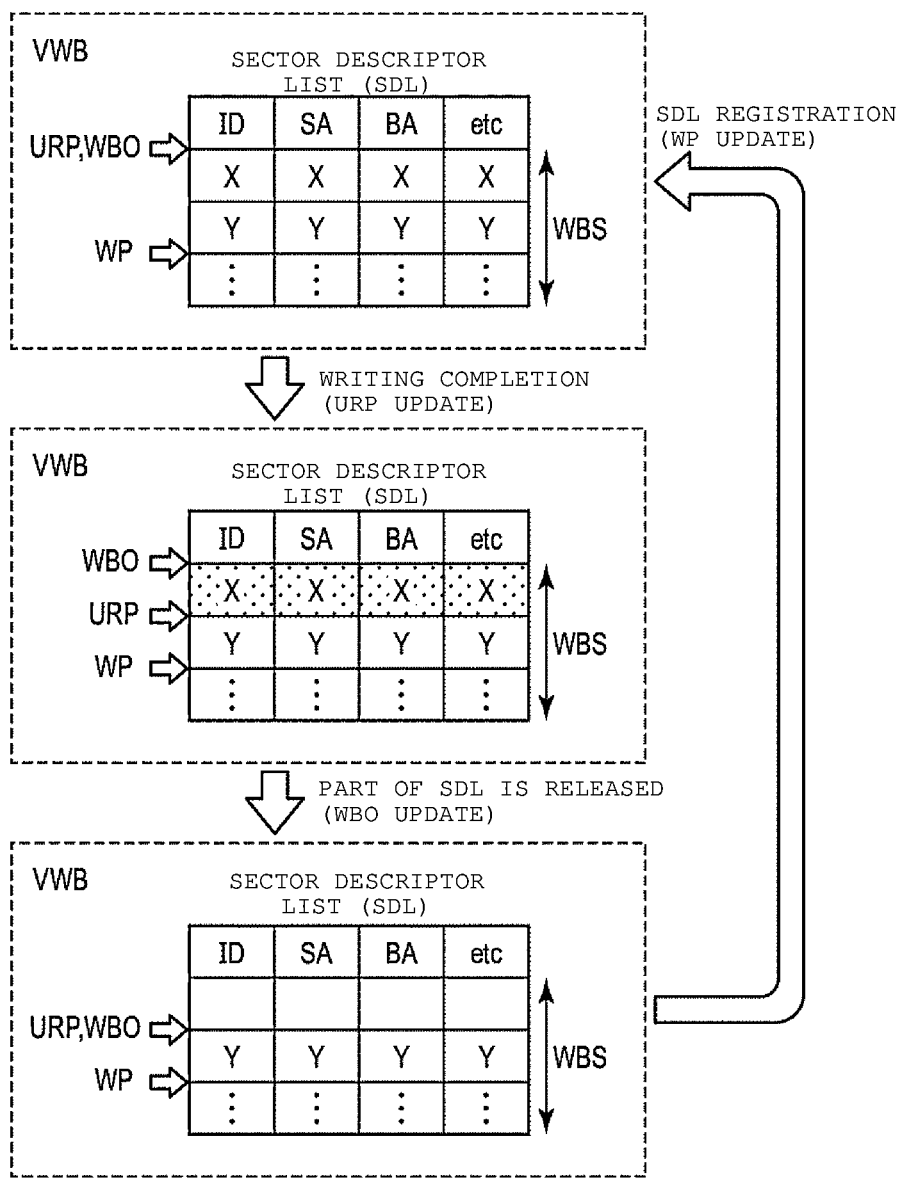
FIG. 6 is a diagram illustrating an update operation of a sector descriptor list of the virtual write buffer of the memory system according to the embodiment.

Next, an update operation of the SDL will be described. FIG. 6 is a diagram illustrating an update operation of the SDL of the virtual write buffer 64 of the memory system according to the embodiment.

The SDL in FIG. 6 has an entry corresponding to write data corresponding to the identifier X, an entry corresponding to write data corresponding to the identifier Y, and so on. The write data corresponding to the identifier X and the write data corresponding to the identifier Y are data stored in the internal write buffer 63, but are not yet readable.

First, a data write operation of writing the write data corresponding to the identifier X to the NAND flash memory 5 is executed. When the data write operation is completed, the write data corresponding to the identifier X becomes readable data. Accordingly, the controller 4 updates the URP based on the expansion of the readable area. For example, when the SSD 3 executes a multi-step data write operation such as a foggy and fine program operation, the controller 4 updates the URP when a fine program operation of writing the write data corresponding to the identifier X to the NAND flash memory 5 is completed. The foggy and fine program operation includes a foggy program operation and a fine program operation. The foggy program operation is a program operation of roughly setting a threshold voltage of each memory cell at the storage location of the write destination. The data stored in the storage location where only the foggy program operation is executed is the data that cannot be properly read yet. The fine program operation is a program operation of setting the threshold voltage of each memory cell to a target threshold voltage by adjusting the threshold voltage of each memory cell of the storage location of the write destination. The data stored in the storage location of the write destination is readable by executing the fine program operation.

The controller 4 updates the URP, and thus, the entry corresponding to the write data corresponding to the identifier X becomes an entry present between the WBO and the URP. The write data corresponding to the entry between the WBO and the URP is determined to be readable write data.

Since the write data corresponding to the identifier X is readable write data, the controller 4 releases the entry corresponding to the write data corresponding to the identifier X by updating the WBO. At this time, the controller 4 confirms that the data transfer from the storage location of the internal write buffer 63 indicated by the buffer address (BA)X corresponding to the identifier X to the memory 22 of the host 2 is not executed, and then executes the updating of the WBO. The released entry may be used as an entry corresponding to new write data.

As the registration of the source address (SA) in the SDL based on the write command from the host 2 progresses, the WP is updated.

Next, an update width of the URP and a size (WBS) of the virtual write buffer VWB will be described.

The controller 4 can control various generations of non-volatile memories by using the virtual write buffer VWB.

The number of bits written per memory cell differs depending on the type of the non-volatile memory. In a single level cell (SLC)-flash memory, the number of bits written per memory cell is one bit. In a quad level cell (QLC)-flash memory, the number of bits written per memory cell is 4 bits.

The number of planes provided in the memory cell array of the non-volatile memory differs depending on the type of the non-volatile memory. For example, in a non-volatile memory having a multi-plane configuration including two planes, data write operations for two planes are simultaneously executed. In a non-volatile memory having a multi-plane configuration including four planes, data write operations for four planes are simultaneously executed.

The program operation for writing data also differs depending on the type of the non-volatile memory. The program operation includes, for example, a full sequence program operation, a foggy and fine program operation, and the like. The full sequence program operation is a program operation of writing data to one storage location by one program operation. The data stored in the storage location where this one program operation is executed is readable data.

Here, it is assumed that data is written into the NAND flash memory 5 in an SLC mode. A write unit is, for example, 16 KiB (=16 KiB×1 bit (SLC)×1 plane). 16 KiB is an example of a page size. When the sector is 4 KiB, 4 sectors correspond to the write unit.

In this case, the URP is updated in units of 4 sectors, that is, units of 4 offset addresses. The WBS is set to 16 KiB or more, that is, 4 sectors or more.

Next, it is assumed that data is written into the NAND flash memory 5 in a QLC mode by using the foggy and fine program operation. For example, when each of a plurality of word lines (WL) includes four string units (SU0 to SU3), the write unit is, for example, 128 KiB (=16 KiB x 4 bits (QLC)×2 planes). When the sector is 4 KiB, 32 sectors correspond to the write unit. In this case, the URP is updated in units of 32 sectors, that is, units of 32 offset addresses.

When each of the plurality of word lines (WL) includes four string units (SU0 to SU3), the WBS is set to 640 KiB (=128 KiB×5) or more, that is, 160 sectors or more. This is because, since the fine program operation for the memory cell group (WLx, SUy) is executed after the foggy program operation for the memory cell group (WL(x+1), SUy) is completed, it is necessary to store the write data having a size five times a size of the write unit in the internal write buffer 63.

As described above, the update width of the URP and the size (WBS) of the virtual write buffer VWB are adjusted, and thus, it is possible to control various generations of non-volatile memories.

Figure 7:
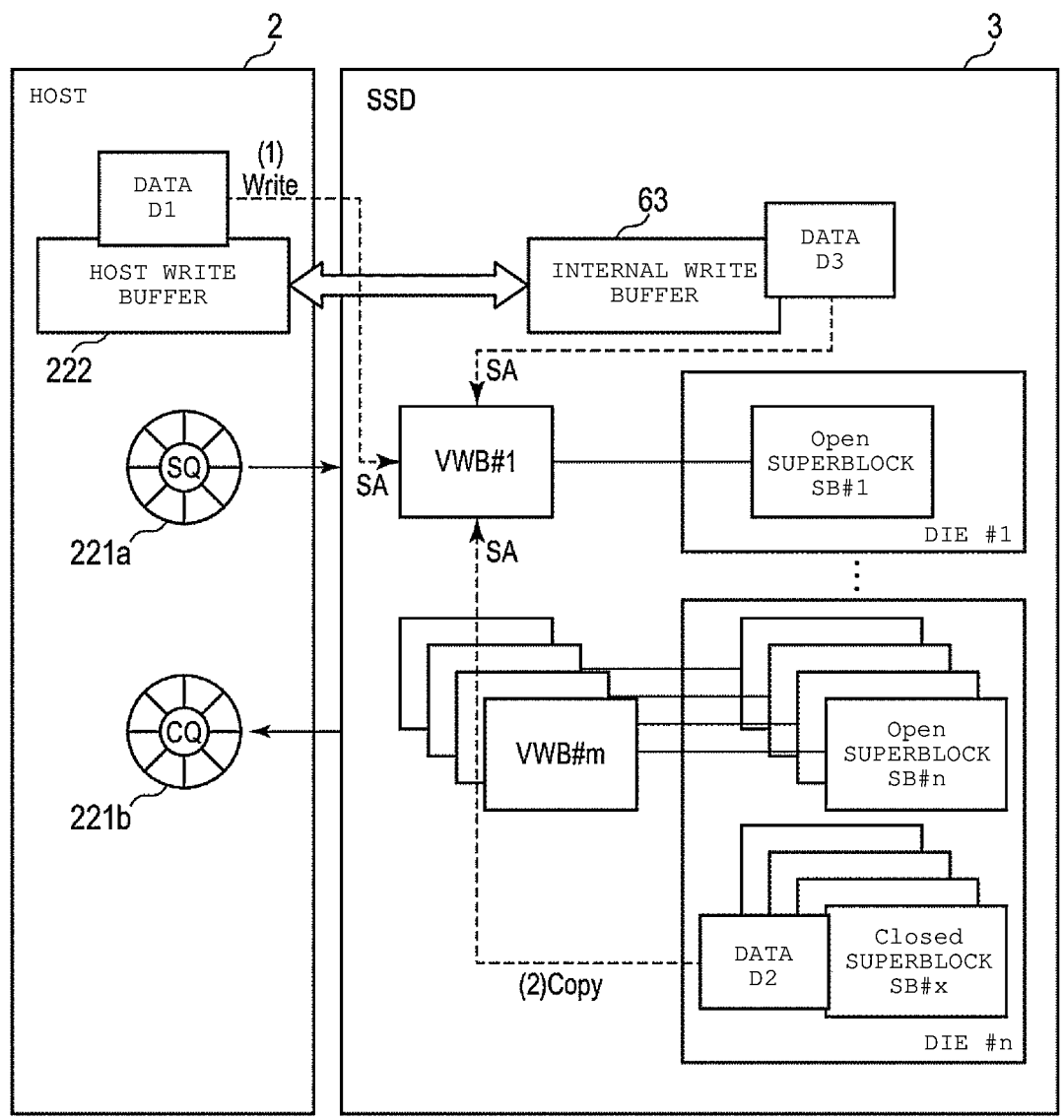
FIG. 7 is a diagram illustrating a type of a source address registered in the virtual write buffer of the memory system according to the embodiment.

Next, the type of the source address registered in the virtual write buffer 64 will be described. FIG. 7 is a diagram illustrating the type of the source address registered in the virtual write buffer 64 of the SSD 3 according to the embodiment.

(1) Write Command

When a write command is received from the host 2, the controller 4 of the SSD 3 determines a write destination superblock SB #1 into which data D1 associated with the received write command is to be written and a write destination storage location in the write destination superblock SB #1. The controller 4 stores each memory address of the host write buffer 222 in which each unit data included in the data D1 associated with the received write command is stored as the source address (SA) in the virtual write buffer VWB #1. When the data D1 is written into the write destination superblock SB #1, the controller 4 transfers the data D1 from the host write buffer 222 to the internal write buffer 63.

(2) Copy Command

When a copy command for copying data D2 to be copied to the write destination superblock SB #1 is received from the host 2, the controller 4 of the SSD 3 stores, as the source address (SA), the physical addresses (e.g., block address and offset address) of the copy source block (here, superblock SB #x) in which each unit data included in the data D2 to be copied is stored in the virtual write buffer VWB #1. When the data D2 to be copied is copied to the write destination superblock SB #1 which is the copy destination block, the controller 4 reads the data D1 from the superblock SB #x based on each source address (SA), and transfers the read data D1 to the internal write buffer 63. Even in a copy operation for garbage collection, each physical address of the copy source block is stored, as the source address (SA), in the virtual write buffer VWB #1.

(3) In Case Write Data to be Written is Already Present in Internal Write Buffer When the write data to be written is already present in the internal write buffer 63, each memory address of the internal write buffer 63 in which each unit data included in the write data is stored is stored, as the source address (SA), in the virtual write buffer VWB #1. In this case, since the source address (SA) and the buffer address (BA) are equal, it is not necessary to transfer the write data from the source address (SA) to the buffer address (BA).

Figure 8:
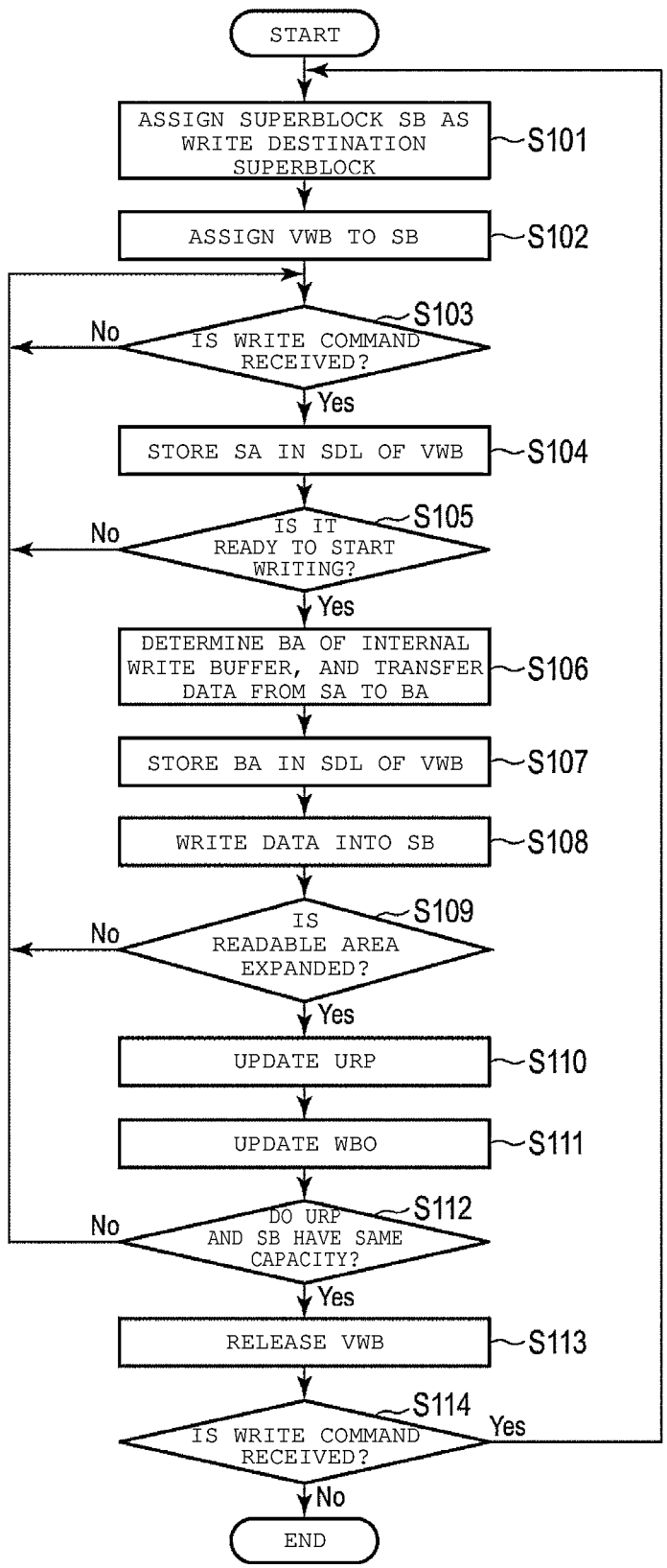
FIG. 8 is a flowchart illustrating a procedure of a write operation executed in the memory system according to the embodiment.

Next, a write operation will be described. FIG. 8 is a flowchart illustrating a procedure of a write operation executed in the SSD 3 according to the embodiment.

First, the controller 4 assigns a superblock as the write destination superblock (step S101). The controller 4 selects a superblock from the superblocks in the free block list 623. The controller 4 executes an erase operation on the selected superblock. The controller 4 assigns the superblock on which the erase operation is executed as the write destination block.

The controller 4 assigns the virtual write buffer 64 to the superblock assigned as the write destination block (step S102). When the superblock has been already assigned as the write destination block, the controller 4 omits a procedure of step S101 and step S102. Here, although, in the disclosed implementation, the case where the virtual write buffer 64 is assigned to the write destination block after the erase operation for the superblock (write destination block) is executed, an erase operation for the write destination block may be executed after the virtual write buffer 64 is assigned to the write destination block. For example, when the number of source addresses corresponding to the write size is accumulated for the first time in the virtual write buffer 64, the erase operation for the write destination block may be executed.

The controller 4 determines whether or not a write command is received from the host 2 (step S103). The controller 4 determines whether or not the write command is stored in the submission queue (SQ) 221*a*.

When the write command is not received from the host 2 (No in step S103), the controller 4 waits until the write command is received.

When the write command is received from the host 2 (Yes in step S103), the controller 4 stores the source address (SA) in the sector descriptor list (SDL) of the virtual write buffer 64 (step S104). In this case, the controller 4 determines the offset address in the superblock into which the write data associated with the received write command is to be written. The controller 4 determines each entry of the SDL in which the source address (SA) is stored based on the determined offset address and the number of sectors designated by the received write command. The controller 4 stores the SA indicating the storage location where the write data associated with the received write command is stored in the determined entry. The controller 4 updates the WP of the SDL.

The controller 4 determines whether or not the write operation is ready to be started (step S105). The controller 4 determines whether or not a total size of the write data to be written into the write destination block reaches a predetermined write size. The controller 4 may grasp the total size of the write data by referring to the number of SAs stored in the SDL.

When the write operation is not ready to be started (No in step S105), the controller 4 waits until a subsequent write command is received from the host 2 (step S103).

When the write operation is ready to be started (Yes in step S105), the controller 4 executes the processing of steps S106 to S108 to write the write data to the write destination block. The processing of step S103 and the processing of steps S106 to S108 may be executed in parallel. In this case, even though the write operation is ready to be started (Yes in step S105), when the write command is received, the controller 4 can execute processing of storing the source address (SA) in the entry of the SDL in parallel with the processing of steps S106 to S108.

When the write operation is ready to be started (Yes in step S105), the controller 4 determines the buffer address (BA) indicating the storage location of the internal write buffer 63, and transfers the write data from the storage location indicated by the SA to the storage location indicated by the BA (step S106). The controller 4 determines the BA indicating the storage location of the internal write buffer 63 where each unit data included in the write data is to be stored. The controller 4 reads the write data from the storage location indicated by the SA, and stores the read write data in the storage location indicated by the BA.

The controller 4 stores the determined BA in the SDL of the virtual write buffer 64 (step S107). Here, although the BA is stored in the SDL of the virtual write buffer 64 after the write data is transferred to the internal write buffer 63 in the described implementation, the BA may be first stored in the SDL of the virtual write buffer 64, and then the write data may be transferred to the internal write buffer 63. In this case, each entry in the SDL may include a flag indicating whether or not the write data has been transferred to the internal write buffer 63.

The controller 4 writes the write data transferred to the internal write buffer 63 to the write destination block (step S108).

The controller 4 determines whether or not the readable area is expanded (step S109). The controller 4 determines whether or not there is newly readable data in the data write operation in step S108.

When the readable area is not expanded (No in step S109), the controller 4 waits until a subsequent write command is received from the host 2 (step S103).

When the readable area is expanded (Yes in step S109), the controller 4 updates the URP (step S110). The controller 4 updates the URP such that the URP indicates a next entry of the entries of the SDL corresponding to newly readable write data. Accordingly, the URP indicates the storage location at the head of the write incompletion area.

The controller 4 confirms that the data transfer from the storage location of the internal write buffer 63 indicated by the BA of the SDL corresponding to the newly readable write data to the memory 22 of the host 2 has not been executed, and then updates the WBO (step S111). When it is confirmed that the data transfer from the storage location of the internal write buffer 63 indicated by the BA of the SDL corresponding to the newly readable write data to the memory 22 of the host 2 has not been executed, the controller 4 updates the WBO such that the WBO indicates the same location as the updated URP. Accordingly, the entry corresponding to the newly readable write data is released.

The controller 4 determines whether or not the URP and the write destination block have the same capacity (step S112). That is, the controller 4 determines whether or not the URP is a value obtained by adding 1 to the offset address indicating the storage location at the end of the write completion area of the write destination block.

When the URP and the write destination block do not have the same capacity (No in step S112), the controller 4 waits until a subsequent write command is received from the host 2 (step S103), and the controller 4 determines that the write destination block has the write incompletion area.

When the URP and the write destination block have the same capacity (Yes in step S112), the controller 4 releases the virtual write buffer 64 (i.e., dissociates the virtual write buffer 64 from the assigned superblock) (step S113). When the URP is a value obtained by adding 1 to the offset address indicating the storage location at the end of the write completion area of the write destination block, the controller 4 registers the write destination block in the closed block list 622. The assignment of the virtual write buffer 64 to the superblock registered in the closed block list 622 is released. The virtual write buffer 64 of which the assignment is released becomes available when a new superblock is assigned to the write destination block.

The controller 4 determines whether or not a write command has been received from the host 2 (step S113).

When the write command is not received from the host 2 (No in step S114), the controller 4 ends the write operation.

When the write command is received from the host 2 (Yes in step S114), the controller 4 returns to step S101 and assigns a new superblock SB as the write destination block.

Figure 9:
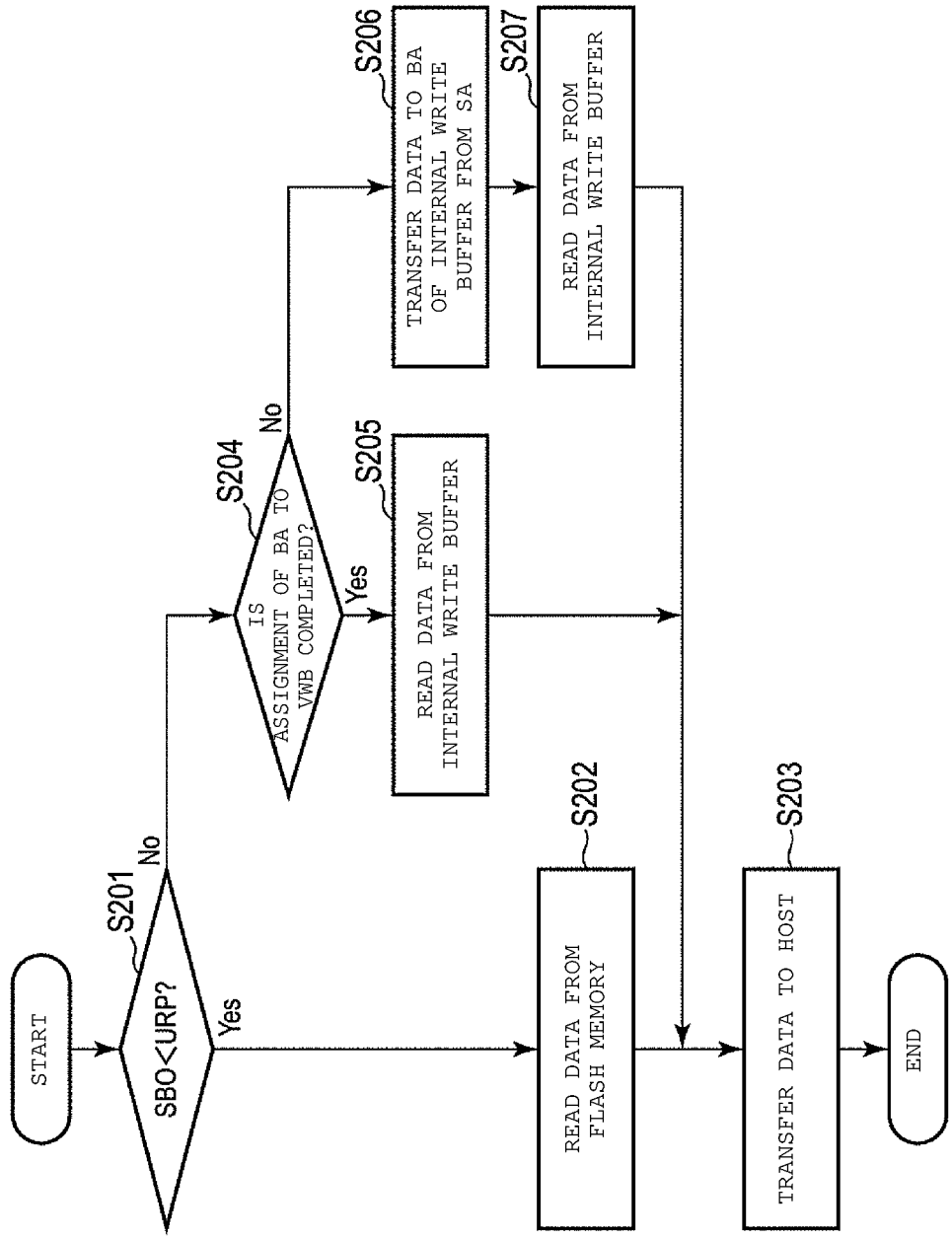
FIG. 9 is a flowchart illustrating a procedure of a read operation executed in the memory system according to the embodiment.

Next, a read operation will be described. FIG. 9 is a flowchart illustrating a procedure of the read operation executed in the SSD 3 according to the embodiment.

First, the controller 4 determines whether or not a superblock offset (SBO) designated by the received read command is less than the URP (step S201). The controller 4 specifies the physical address corresponding to the logical address designated by the read command by using the L2P table 61. The physical address includes a superblock address (SBA) and the SBO. The SBA is a block address that identifies a superblock. The SBO is an offset address that can uniquely specify a storage location included in the superblock.

When the SBO is less than the URP (Yes in step S201), the controller 4 determines that the data designated by the read command is readable from the NAND flash memory 5. The controller 4 reads data from the NAND flash memory 5 (step S202).

The controller 4 transfers the read data to the host 2 (step S203).

The controller 4 ends the read operation.

When the SBO is equal to or more than the URP (No in step S201), the controller 4 determines whether or not the assignment of the buffer address (BA) is completed to the virtual write buffer 64 (step S204). The controller 4 determines whether or not the BA is stored in the entry corresponding to the data associated with the read command.

When the BA is assigned to the virtual write buffer 64 (Yes in step S204), the controller 4 reads data from the storage location of the internal write buffer 63 indicated by the BA (step S205).

The controller 4 transfers the read data to the host 2 (step S203).

The controller 4 ends the read operation.

When the BA is not assigned to the virtual write buffer 64 (No in step S204), the controller 4 transfers the data from the storage location indicated by the SA to the storage location of the internal write buffer 63 indicated by the BA (step S206). The controller 4 determines the BA indicating the storage location of the internal write buffer 63. The controller 4 reads the data designated by the read command from the storage location indicated by the SA, and stores the read data in the storage location of the internal write buffer 63 indicated by the determined BA.

The controller 4 reads the data designated by the read command from the storage location of the internal write buffer 63 indicated by the BA (step S207).

The controller 4 transfers the read data to the host 2 (step S203).

Then, the controller 4 ends the read operation.

As described above, according to the present embodiment, the controller 4 can manage the data to be written into the NAND flash memory 5 by using the virtual write buffer 64.

When the write command is received from the host 2, the controller 4 correlates the write data associated with the write command with the entry of the sector descriptor list (SDL) on a sector size basis. The controller 4 stores the address indicating the storage location of the host 2 where the write data is stored as the source address (SA) in each entry of the SDL. Accordingly, the controller 4 can check the total size of the write data by referring to the number of source addresses (SA) of the SDL.

This means that the total size of the write data can be determined without storing the write data in the internal write buffer 63. Thus, the required size of the internal write buffer 63 can be reduced as compared with the case where the total size of the write data is determined by storing the write data in the internal write buffer 63.

When the data is written into the write destination block of the NAND flash memory 5, the controller 4 stores, as the buffer address (BA), an address indicating the storage location of the internal write buffer 63 in a case where the data to be written is stored in the internal write buffer 63 in the SDL. This operation is a common operation when this operation is executed based on the write command or the copy command issued from the host 2. The controller 4 can read the data stored in the internal write buffer 63 by referring to the BA regardless of the type of the command.

Accordingly, the controller 4 may also write the data designated by the write command and the data designated by the copy command to the identical write destination block.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, comprising:
    a volatile memory;
    a nonvolatile memory including a plurality of blocks, each of the plurality of blocks being a unit of a data erase operation; and
    a controller configured to:
        manage a plurality of block groups, each of the plurality of block groups including one or more of the plurality of blocks, the plurality of block groups including at least a first block group;
        in response to receiving, from the host, a write command to write first data to the nonvolatile memory, the write command designating at least a first address that indicates a first location of a memory of the host where the first data is stored,
            determine the first block group as a write destination of the write command;
            generate, in the volatile memory, a first list associated with the first block group;
        add, to the first list, first information indicating the first address; and
        add, to the first list, second information indicating a second address that indicates a second location of the volatile memory where the first data is to be transferred from the first location of the memory of the host; and
        in response to receiving, from the host, a read command to read the first data,
            determine, by referring to the first list in the volatile memory, whether the first data has already been transferred from the first location of the memory of the host to the second location;
            when the first data has not yet been transferred from the first location of the memory of the host to the second location, transfer the first data from the first location of the memory of the host to the second location; and
            transfer the first data from the second location to the host.

2. The memory system according to claim 1, wherein the controller is further configured to:
    in response to the first data becoming readable from the nonvolatile memory as a result of processing requested by the write command, determine whether the first data is being transferred from the second location to the host; and
    when the first data is not being transferred from the second location to the host, delete the second information from the first list.

3. The memory system according to claim 2, wherein the controller is further configured to,
    when the first data is being transferred from the second location to the host, wait for the transfer of the first data from the second location to the host to be finished before deleting the second information from the first list.

4. The memory system according to claim 2, wherein the controller is further configured to:
    manage a first pointer indicating a location of the volatile memory where the second information is stored; and
    delete the second information from the first list by changing a value of the first pointer.

5. The memory system according to claim 1, wherein the controller is further configured to determine, by referring to the first list in the volatile memory, a size of the first data before transferring the first data from the first location of the memory of the host to the second location.

6. The memory system according to claim 1, wherein the controller is further configured to:
    determine, based on information in the first list, whether a write operation to the nonvolatile memory according to the write command is ready to be performed or not; and
    in response to determining that the write operation is ready to be performed, add the second information to the first list.

7. The memory system according to claim 6, wherein a minimum data size for performing the write operation to the nonvolatile memory is a first size, and the controller is configured to determine that the write operation is ready to be performed when a total size of data which includes at least the first data and is to be written to the first block group is larger or equal to the first size.

8. The memory system according to claim 6, wherein the first list includes a plurality of entries, each of the plurality of entries corresponding to a second size of data to be written to the first block group, and
the controller is configured to determine, based on the number of entries of the first list, whether the write operation to the nonvolatile memory according to the write command is ready to be performed or not.

9. The memory system according to claim 1, wherein the plurality of block groups further includes a second block group,
the first list includes a plurality of entries, each of the plurality of entries including at least a first field and a second field, the plurality of entries including at least a first entry and a second entry, and
the controller is configured to:
in response to receiving, from the host, the write command,
  add, to the first field of the first entry, the first information; and
  add, to the second field of the first entry, the second information, and
the controller is further configured to:
in copying second data from the second block group to the first block group,
  add, to the first field of the second entry, third information indicating a third address that indicates a third location of the second block group where the second data is stored; and
add, to the second field of the second entry, fourth information indicating a fourth address that indicates a fourth location of the volatile memory where the second data is to be transferred from the third location of the second block group.

10. The memory system according to claim 9, wherein the controller is configured to:
in writing the first data to the first block group, write the first data from the second location of the volatile memory to the first block group by referring to the second field of the first entry; and
in copying the second data to the first block group, write the second data from the fourth location of the volatile memory to the first block group by referring to the second field of the second entry.

11. A method of controlling a nonvolatile memory in a memory system connectable to a host, the memory system including the nonvolatile memory and a volatile memory, the nonvolatile memory including a plurality of blocks, each of the plurality of blocks being a unit of a data erase operation, the method comprising:
managing a plurality of block groups, each of the plurality of block groups including one or more of the plurality of blocks, the plurality of block groups including at least a first block group;
receiving, from the host, a write command to write first data to the nonvolatile memory, the write command designating at least a first address that indicates a first location of a memory of the host where the first data is stored;
in response to receiving, from the host, the write command,
  determining the first block group as a write destination of the write command;
  generating, in the volatile memory, a first list associated with the first block group;
adding, to the first list, first information indicating the first address; and
adding, to the first list, second information indicating a second address that indicates a second location of the volatile memory where the first data is to be transferred from the first location of the memory of the host;
receiving, from the host, a read command to read the first data; and
in response to receiving, from the host, the read command,
  determining, by referring to the first list in the volatile memory, that the first data has not yet been transferred from the first location of the memory of the host to the second location;
  in response to determining that the first data has not yet been transferred from the first location of the memory of the host to the second location, transferring the first data from the first location of the memory of the host to the second location; and
  transferring the first data from the second location to the host.

12. The method according to claim 11, further comprising:
determining that the first data becomes readable from the nonvolatile memory as a result of processing requested by the write command;
in response to determining that the first data becomes readable from the nonvolatile memory, determining that the first data is not being transferred from the second location to the host; and
in response to determining that the first data is not being transferred from the second location to the host, deleting the second information from the first list.

13. The method according to claim 12, further comprising:
determining that the first data is being transferred from the second location to the host; and
in response to determining that the first data is being transferred from the second location to the host, waiting for the transfer of the first data from the second location to the host to be finished before deleting the second information from the first list.

14. The method according to claim 12, further comprising:
managing a first pointer indicating a location of the volatile memory where the second information is stored; and
deleting the second information from the first list by changing a value of the first pointer.

15. The method according to claim 11, further comprising:
determining, by referring to the first list in the volatile memory, a size of the first data before transferring the first data from the first location of the memory of the host to the second location.

16. The method according to claim 11, further comprising:
determining, based on information in the first list, that a write operation to the nonvolatile memory according to the write command is ready to be performed; and
in response to determining that the write operation is ready to be performed, adding the second information to the first list.

17. The method according to claim 16, wherein
a minimum data size for performing the write operation to the nonvolatile memory is a first size, and the method further comprises:
determining that a total size of data which includes at least the first data and is to be written to the first block group is larger or equal to the first size, wherein
the write operation is determined ready to be performed in response to determining that the total size is larger or equal to the first size.

18. The method according to claim 16, wherein
the first list includes a plurality of entries, each of the plurality of entries corresponding to a second size of data to be written to the first block group, and
whether the write operation to the nonvolatile memory according to the write command is ready to be performed or not is determined based on the number of entries of the first list.

19. The method according to claim 11, wherein
the plurality of block groups further includes a second block group,
the first list includes a plurality of entries, each of the plurality of entries including at least a first field and a second field, the plurality of entries including at least a first entry and a second entry,
the first information is added to the first field of the first entry,
the second information is added to the second field of the first entry, and
the method further comprises:
in copying second data from the second block group to the first block group,
    adding, to the first field of the second entry, third information indicating a third address that indicates a third location of the second block group where the second data is stored; and
adding, to the second field of the second entry, fourth information indicating a fourth address that indicates a fourth location of the volatile memory where the second data is to be transferred from the third location of the second block group.

20. The method according to claim 19, wherein
the first data is written from the second location of the volatile memory to the first block group by referring to the second field of the first entry, and
the second data is written from the fourth location of the volatile memory to the first block group by referring to the second field of the second entry.

* * * * *